Feb. 8, 1938.   O. A. ROGERS   2,108,004
ELECTRODE MATERIAL AND METHOD OF MAKING THE SAME
Filed March 29, 1935   3 Sheets-Sheet 1

INVENTOR
OWEN A. ROGERS
BY
Bartlett Eyre Scott & Keel
ATTORNEYS

Feb. 8, 1938. O. A. ROGERS 2,108,004
ELECTRODE MATERIAL AND METHOD OF MAKING THE SAME
Filed March 29, 1935 3 Sheets-Sheet 2
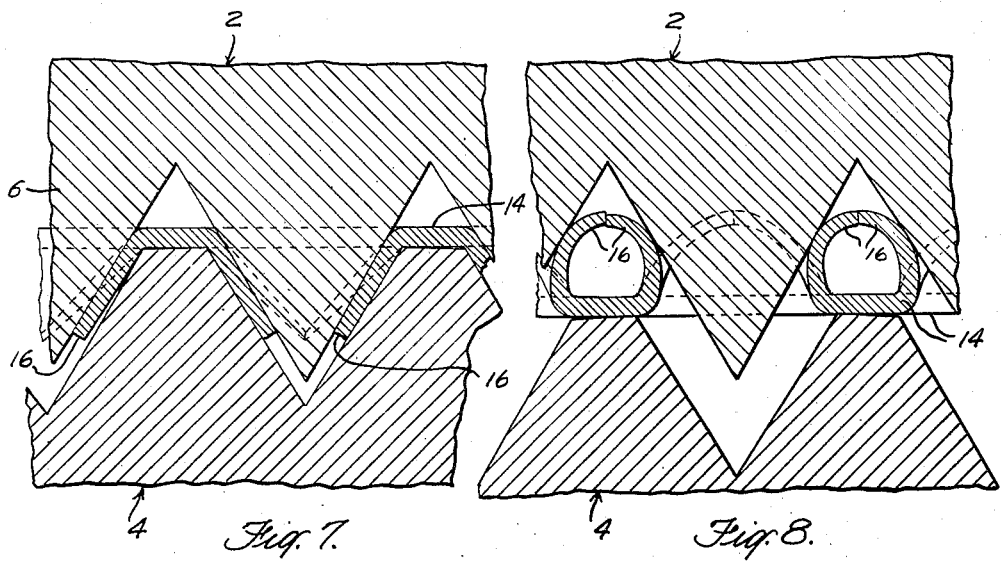
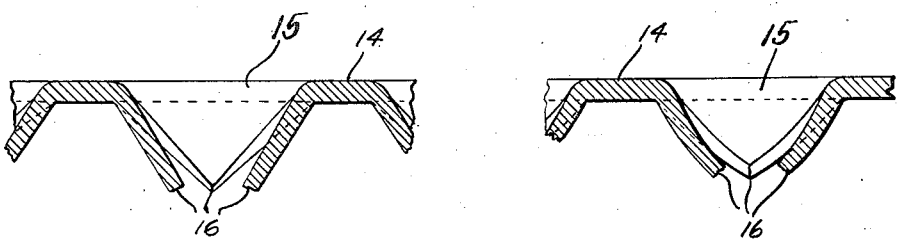
INVENTOR
OWEN A. ROGERS.
BY
ATTORNEYS Feb. 8, 1938. O. A. ROGERS 2,108,004
ELECTRODE MATERIAL AND METHOD OF MAKING THE SAME
Filed March 29, 1935  3 Sheets-Sheet 3

INVENTOR
OWEN A. ROGERS.
BY
ATTORNEYS

Patented Feb. 8, 1938

2,108,004

UNITED STATES PATENT OFFICE 2,108,004

ELECTRODE MATERIAL AND METHOD OF MAKING THE SAME

Owen A. Rogers, Newark, N. J., assignor to Driver-Harris Company, Harrison, N. J., a corporation of New Jersey Application March 29, 1935, Serial No. 13,653

6 Claims. (Cl. 29—155.5)

The present invention relates to electrodes for electronic tubes, and has special reference to material particularly adapted for forming such electrodes. The invention further relates to a method of making the material.

My improved electrode is of the type of the one described and claimed in the patent to John Hoza, "Radio tube", No. 1,975,721, dated October 2, 1934. The electrode of this patent, like the one of the present application is made of multi-perforated sheet metal, such as cold rolled nickel strip. This perforated sheet metal electrode was designed to have heat dissipating qualities similarly to wire mesh which had been previously used, but to overcome certain of the disadvantages of the use of wire mesh.

The nickel strip has been perforated either by means of punches which make clean cut circular perforations in the strip, or by running the strip between two rolls, one having projections, the other having depressions, which form burrs on one side of the strip, strip perforated by the latter method being known as protruded strip. The punching out of the clean cut perforations in the strip is a relatively slow and expensive operation, while the protruded strip can be cheaply manufactured. In forming the protruded strip, the projections or teeth on the forming rolls act first to indent the strip, and as the strip passes tangentially to both the male and female rolls the teeth are forced through the strip. This initial indenting and subsequent breaking through of the teeth on the male roll, results in the burrs having extremely rough edges. Also, as the teeth of the male roll become dull, the perforations are liable to be unevenly formed. The projecting burrs cause the strip to be difficult to handle, and to weld to the support wires, and also the strip is difficult to clean. Moreover, the projecting burrs materially interfere with the dissipation of heat through the perforations. The protruded material as commonly used has the aggregate area of its perforations only seventeen to nineteen per centum of the aggregate area of the material, and thus intercepts more of the radiant heat than wire mesh which as used has approximately thirty-three percentum of openings.

One of the objects of the present invention is to provide perforated material, particularly adapted for electrodes, which has all of the advantages of both the clean cut perforated material and the protruded material, while overcoming the disadvantages.

Another of the objects of the invention is to provide perforated sheet metal of this character in which the perforations are of uniform size and shape, and the material is of maximum strength throughout.

Another of the objects of the invention is to provide a novel and improved method of making perforated material of the character indicated.

The several features of the invention, whereby the above-mentioned and other objects may be attained, will be readily understood from the following description and accompanying drawings, in which:

Figures 1, 2, and 3 are diagrammatical end views of male and female perforating rolls shown operating on a strip of sheet metal in performing the first three operations of my improved method;

Fig. 7 is a view similar to Fig. 5 with the rolls adjusted to perform the second step;

Fig. 8 is a similar view with the rolls adjusted to form the third step;

Fig. 9 is a detail sectional view of a portion of the material after it has been operated upon by the perforating rolls as shown in Fig. 5;

Fig. 10 is a similar view of the material after it has been operated upon by the perforating rolls as shown in Fig. 7;

In carrying out my improved method, a perforating machine may be employed of the type of the one illustrated and described in the patent to Thomas A. Edison, "Apparatus for producing perforated strips", No. 870,024, dated November 5, 1907. This apparatus is provided with male and female perforating rolls, the upper, or male roll, being adjustable toward and from the lower roll, and the upper roll being driven.

Figure 1:
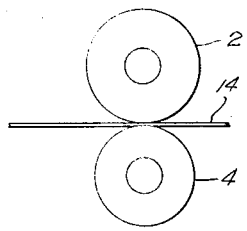
Figure 2:
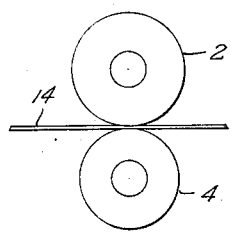
Figure 3:
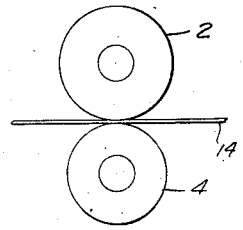
Figure 4:
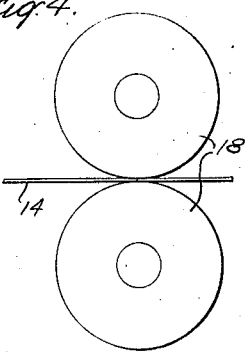
Fig. 4 is a diagrammatical end view of pressure rolls used in performing the final step of the method.

The male and female perforating rolls 2 and 4, respectively, illustrated in Figs. 1, 2, and 4 of the drawings may be of the general form of the perforating rolls of said Edison patent.

The male roll 2 is provided with radially projecting teeth 6 and the female roll 4 is provided with depressions 8. To form the teeth 6, V-shaped grooves 10 are cut longitudinally in the surface of the roll (Fig. 5), and similar grooves 12 are cut in the surface of the roll circumferentially thereof. After the teeth 6 are thus formed the male roll is hardened. This roll is then rolled in contact with the female roll 4 so as to cause the teeth 6 to be forced into the female roll and thus form the corresponding depressions 8. The female roll is then hardened which completes the formation of the two rolls. The male roll is preferably made slightly larger in diameter than the female roll so that during the rotation of the rolls the teeth of the male roll will enter different depressions in the female roll. This manner of forming teeth and depressions in the rolls is well known in the art.

The two sides of the teeth 6 which are formed by the longitudinal groove 10 may be at an angle of thirty degrees, and the two sides of the teeth formed by the grooves 12 may be at an angle of twenty-two and one-half degrees. The inclination of the walls of the teeth, however, may be varied to meet different conditions.

Figure 5:
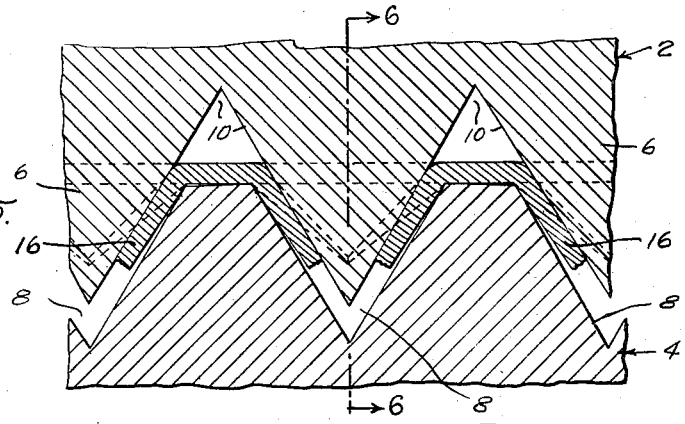
Fig. 5 is a detail sectional view, on an enlarged scale, of a portion of the male and female rolls illustrated in Fig. 1 adjusted to form the first step of the method, the section being taken on a plane at right angles to the axes of the rolls.
Figure 6:
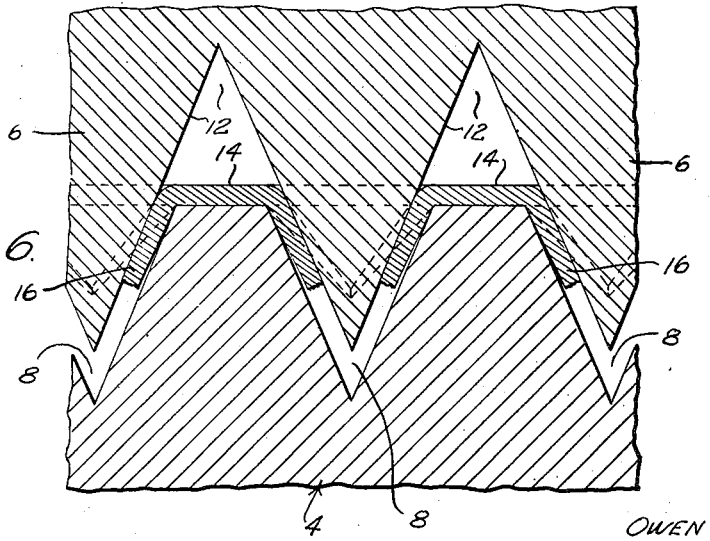
Fig. 6 is a sectional view taken on the line 6—6 of Fig. 5.

Perforated sheet material commonly used in radio tubes for the anode and screen grid is made of cold rolled nickel or nickel alloy of substantially three thousandths of an inch in thickness. In perforating the material in accordance with my improved method, a strip 14 of the material is first run between the perforating rolls 2 and 4, Fig. 1. This operation forms perforations 15 in the strip as illustrated in Figs. 5 and 9. The teeth of the male roll first indent the material of the strip as the material is forced down by each tooth of the upper roll into the corresponding depression in the lower roll. When the material reaches its elastic limit the teeth break through the material and force it against the walls of the depressions in the lower roll. This operation forms four burrs 16 on the under side of the strip of more or less triangular form. As the teeth leave the material, the burrs 16 tend to curl inwardly as illustrated in Fig. 9 and thus partially close the perforations.

The strip is then preferably run through the perforating rolls a second time (Fig. 2). Previously to performing this second operation, it is preferable to slightly adjust the rolls closer together, so as to cause the teeth of the upper roll to firmly press the material against the sides of the associated depressions in the lower roll.

This second rolling operation straightens out the burrs and compresses the material thereof so that when the material leaves the rolls, the burrs are set in substantially the position shown in Fig. 10. Also, this operation makes the perforations slightly larger.

The strip is then reversed in position so as to position the burrs on the top side of the strip, and run between the perforating rolls a third time. Previously to this operation, the rolls are adjusted a distance apart so as to enable the teeth of the upper roll to enter the spaces between the ends of the burrs. This operation spreads the ends of the burrs in a manner diagrammatically illustrated in Fig. 8.

Figure 11:
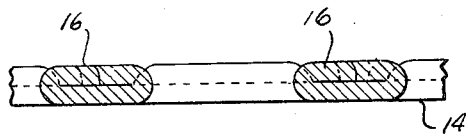
Fig. 11 is a detail transverse sectional view of the material after the completion of the operations thereon in accordance with my improved method.
Figure 13:
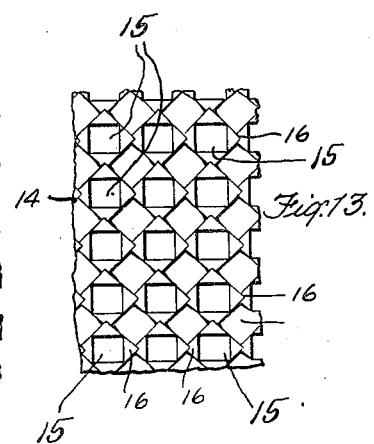

The strip is then run between pressure rolls 18 which firmly press the outwardly spread burrs downwardly against the side of the strip as illustrated in Figs. 11 and 13.

Figure 12:
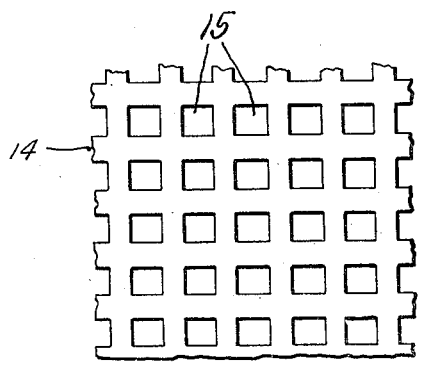
Figs. 12 and 13 are face views of opposite sides of the completed material.

The perforated strip (Figs. 12 and 13) formed in accordance with my improved method has the perforations uniformly arranged and of uniform size and shape. In the use of the material for electrodes of electronic tubes, the perforations are preferably made substantially one thousand and twenty-four (1024) to the square inch. The total face or smallest area of the perforations may be from twenty-eight (28) to thirty-five per centum (35%) of the area of the strip, depending upon the degree of final rolling. In forming the final operation of running the strip between the perforating rolls, as illustrated in Fig. 8, the tips of the burrs between adjacent holes in the strip are brought substantially together as illustrated. When the burrs have been thus operated upon, the rolling of the strip causes the burrs to be more or less crushed and folded down in substantial overlapping relation and firmly clinched together so that the burrs of each two adjacent holes are formed into a substantially solid mass extending between the perforations as illustrated in Fig. 11. Such rolling down of the burrs, materially strengthens the strip between the rows of perforations both longitudinally and transversely of the strip. The rolling operation also uniformly smooths and flattens the burrs so that there are no projecting points on the burrs that interfere with handling of the strip. The uniformity in the size and shape of the perforations is not affected by wearing of the teeth of the perforating rolls as in the case of the protruded material.

By increasing the rolling pressure in performing the final step of my improved method, the overall thickness of the strip may be varied as desired.

Figure 14:
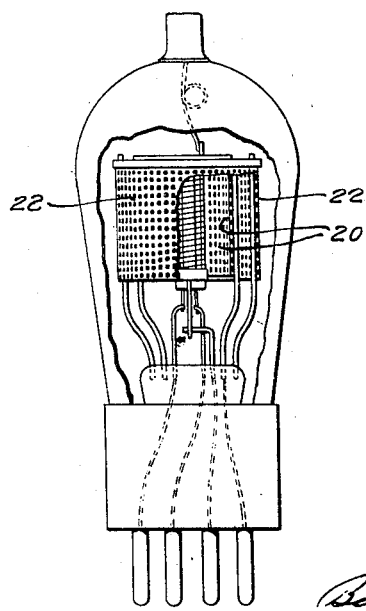
Fig. 14 is a front elevation, with parts broken away, of an electron tube, such as a tube for receiving sets, having the screen grid and anode made of my improved material.

The strip as thus formed may be easily cut and shaped to form the anode 20 or screen grid 22 of an electronic tube as illustrated in Fig. 14.

When used as electrodes the rounded edges of the perforations allow for the maximum dissipation of heat through the perforations and to the outer envelope or glass bulb of the tube. The uniform flattening of the burrs on the side of the strip and the uniformity of the perforations both in size and shape insures that the electrodes made of the material will have uniform electrical and heat dissipating properties.

While it is preferable to firmly press the burrs downwardly against the side of the strip by means of the final rolling operation as above described, the degree of rolling pressure may be varied and in certain instances dispensed with.

As will be evident to those skilled in the art, my invention permits various modifications without departing from the spirit thereof or the scope of the appended claims.

What I claim is:

1. An electrode for electronic tubes formed of thin sheet metal having substantially rectangular perforations of a number of the order of several hundred perforations to the square inch with the material at the edges of the perforations bent back and flattened against a side of the strip.

2. An electrode for electronic tubes formed of thin sheet metal having substantially rectangular perforations of a number of the order of several hundred to the square inch, the width of each perforations being greater than the width of the material between the perforations, and each perforation having the material at its edges bent back and pressed against a side of the strip.

3. A structure according to claim 2 in which the material of adjacent edges of adjacent perforations extend completely across the material between said perforations.

4. The method of forming a multi-perforated strip of thin sheet metal which comprises passing the strip between two rolls, one of the rolls having teeth and the other roll having corresponding depressions for receiving the teeth so as to cause burrs to project from one side of the strip, reversing the strip in position and again passing it between said rolls so as to cause the said teeth to enter the spaces between the burrs and to bend said burrs outwardly, and then applying rolling pressure to the material to flatten and press the burrs against said side of the strip.

5. An electrode for electronic tubes formed of thin sheet metal having substantial rectangular perforations of a number of the order of several hundred perforations to the square inch, said perforations having projecting burrs on one side thereof with the burrs of adjacent edges of adjacent perforations bent back over and substantially against the material between said edges.

6. The method of forming a multi-perforated strip of thin sheet metal which comprises passing the strip between two rolls so as to form closely spaced rectangular perforations in the strip with burrs at the edges of the perforations projecting from one side of the strip, the burrs being at an angle less than a right angle to said side of the strip, again passing the strip between perforating rolls so as to bend said burrs outwardly at an angle greater than a right angle, and then applying pressure to the material to press the burrs against said side of the strip and between the perforations.

OWEN A. ROGERS.